July 3, 1962

H. J. BAUMAN 3,042,384

FOOD SERVING CART

Filed Aug. 10, 1959

INVENTOR.
Henry J. Bauman
BY
Horton, Davis, Brewer + Brugman
Attys.

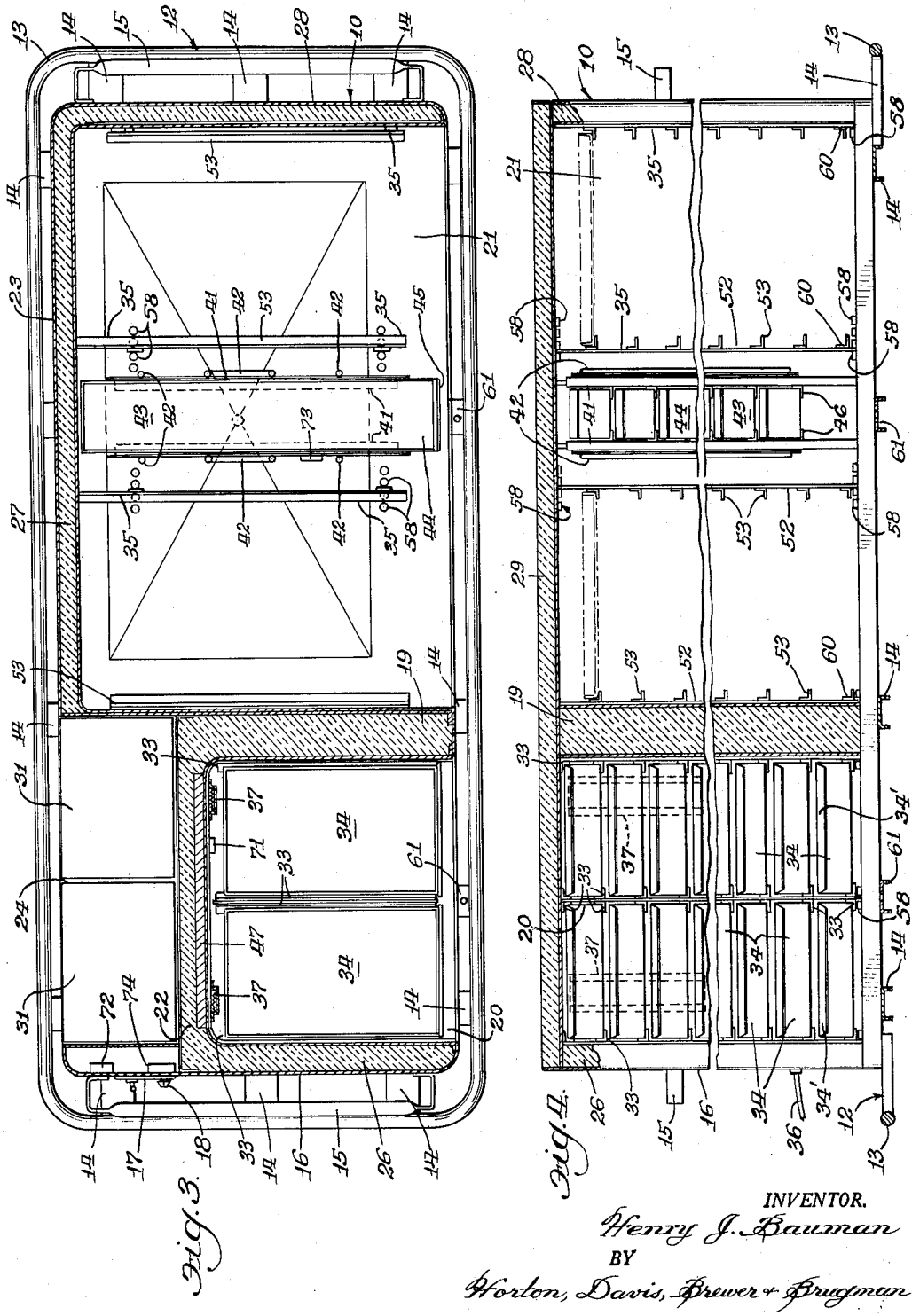

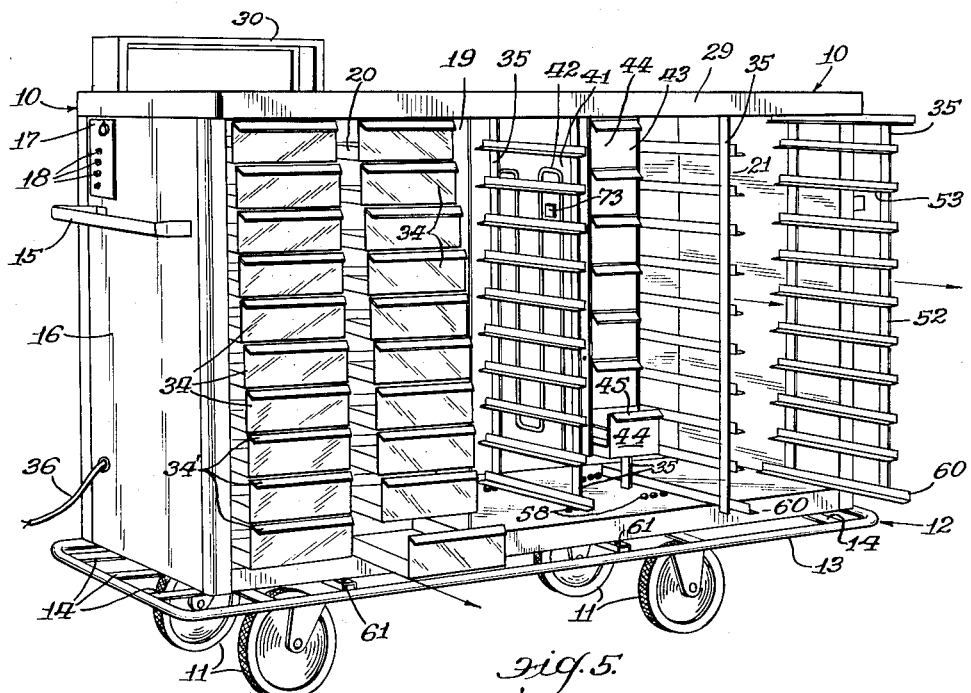

3,042,384
FOOD SERVING CART
Henry J. Bauman, Richfield, Minn., assignor to Nutting Truck and Caster Company, Faribault, Minn.
Filed Aug. 10, 1959, Ser. No. 832,607
1 Claim. (Cl. 257—293)

This invention relates to a food serving cart, in particular a food serving cart for dispensing food to hospital patients.

Serving food to bed-ridden hospital patients presents many problems. Food must be served remote from kitchen facilities. Many hospital patients require special diets and serious consequences may result from confusing one patient's diet with that of another. It is also important that foods be served at the proper temperature and condition since a high degree of palatability is desirable to encourage adequate food intake.

Many food serving carts have been employed for this purpose ranging from simple tea carts to complex devices having moving belt assembly lines and heated and refrigerated chambers. Extremely simple carts usually fail to perform their function while the complex carts are difficult to clean, difficult to transport and represent a large initial investment.

It is an object of my invention to provide a food serving cart that contains heated and refrigerated chambers to keep hot food and cold food at suitable temperature and in palatable condition.

It is another object of my invention to provide a food serving cart comprising a heated chamber that may have heat furnishing capacity at a desired temperature.

It is another object of my invention to provide a food serving cart comprising a refrigerated chamber having heat absorbing capacity and two different cold temperature zones at different temperatures for refrigerating foods requiring different temperatures to keep them in palatable condition.

It is another object of my invention to provide a food serving cart from which hot food may be served on a hot dish and cold food may be served on a cold dish and said hot and cold dishes are uniquely and unmistakably identified with each other to virtually eliminate diet confusion during serving.

It is another object of my invention to provide a food serving cart that is quickly and easily disassembled without tools to expose unobstructed interior surfaces that are readily accessible for cleaning.

It is another object of my invention to provide a food serving cart having movable and interchangeable interior fixtures to accommodate various sized serving dishes.

It is another object of my invention to provide a food serving cart having a beverage container in a recess in the top deck thereof so that hot containers are insulated and shielded during transportation but readily accessible during serving.

It is another object of my invention to provide a food serving cart having pairs of doors, each pair cooperatively hinged along adjacent abutting edges to pivot 180° around a central hinge, as closures for both the heated and the refrigerated chambers thereby to provide complete access to either side of either chamber without having a door protruding beyond the frame of the cart and it is still another object to construct the cart and the doors so that all doors may be easily removed from the cart without tools thereby further increasing the ease and efficiency of cleaning the interior of the cart.

These and other objects are obtained in my food serving cart which includes a wheeled frame having a cabinet supported thereon and having a heated chamber and a refrigerated chamber within said cabinet, the chambers separated by a thermal insulating wall. The cabinet is further provided with a recess in its upper horizontal surface to receive at least one beverage container and it is provided with electrically actuated heating and refrigerating means as well as the control elements for these means. Preferably, the refrigerated chamber contains a heat absorbing member in the form of a volume of material that experiences a change of state at a suitable temperature for keeping the desired temperature in the refrigerated chamber. A heat storing material may be employed in the heated chamber. The temperature of both the heat storing material and the heat absorbing material may be regulated and varied by selection of the proper material for this purpose as will be described in more detail hereinafter.

In combination with the heated and refrigerated chambers, I employ means for maintaining hot dishes in the heated chamber in a plurality of columns, preferably two. The arrangement of cold dishes or trays in the refrigerated chamber is the same as the arrangement of hot dishes in the heated chamber with regard to the number of columns and the number of dishes in each column, so that each hot dish and its corresponding cold dish are associated with each other, positionwise, to almost obviate the possibility of serving one patient's hot dish with a different patient's cold dish.

Other objects and advantages of the invention will be apparent from the following description and the accompanying drawings in which similar characters of reference indicate similar parts throughout the several views.

FIG. 3 is a sectional plan view;

FIG. 4 is a sectional partial elevation view;

FIG. 5 is an isometric view showing the control panel and front with doors removed, drawers partly withdrawn and some of the end brackets partially removed;

FIG. 6 is an enlarged partial view of a tray holding bracket, a cooperating bracket holding member and a broken line representation of a food holding tray or drawer;

FIG. 7 is a partial enlarged view of the food holding brackets in the colder of two refrigerated chambers; and FIG. 8 is an enlarged partial sectional view of the door and hinge attached to the cabinet.

Figures 1, 2:
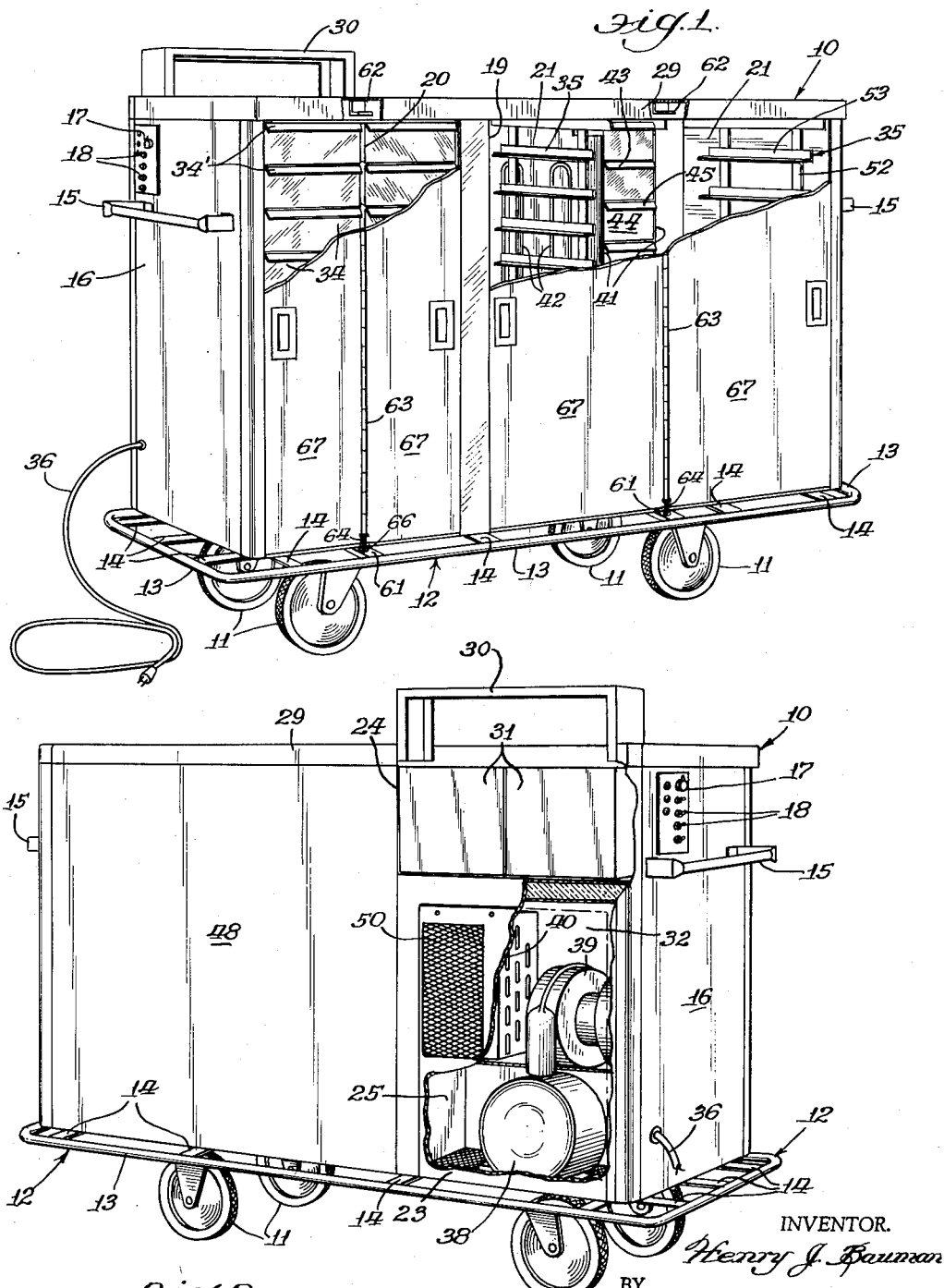
FIG. 1 is a partially cutaway isometric view showing the control panel and the front of the food serving cart.
FIG. 2 is a partially cutaway isometric view showing the control panel and the rear of the food serving cart.

The cart of this invention comprises a cabinet 10 which is made mobile by caster type wheels 11 which are connected to a frame 12 upon which the cabinet 10 is secured. The frame 12 consists of an encircling rail 13 and a series of cross pieces 14 secured both longitudinally and laterally to opposite sides of the rail. The cabinet contains handles 15 secured to panels 16, one of which contains a control panel 17. The control panel contains the actuators and indicators 18 for heating and refrigerating devices employed in the cart.

The cabinet 10 is separated, by an insulated dividing wall 19, into a heated chamber 20 and a refrigerated chamber 21. The refrigerated chamber extends from the front of the cart to the rear panel of cabinet 10 and the heated chamber terminates short of the rear panel in an insulated rear wall 22. Between the insulated rear wall 22 and the rear panel 23, there is a third chamber which is divided into an upper beverage receptacle receiving recess 24, a lower compressor holding chamber 25 and a radiator and blower chamber 32. The heated chamber is also bounded by an insulating side wall 26 and the refrigerated chamber has an insulating rear wall 27 and an insulating side wall 28. The entire upper deck 29 is also insulated.

The beverage receptacle receiving recess 24, as herein shown, is covered with a cowl 30 upon which one or more beverage containers 31 may be placed when in use. The beverage containers 31 are double-walled to maintain the temperature of the beverages and are arranged in chamber 24 so that they cannot tip or spill during transit but can be placed on cowl 30 to facilitate dispensing of beverage.

The heated chamber 20 is provided with drawer supporting brackets 33 which are disposed along each wall and the center of the chamber 20 to support two columns of drawers 34 which are constructed of stainless steel, aluminum or other material capable of holding dishes of hot food and being readily cleaned. The drawers are shown constructed with lips 34' which function both as drawer pulls and as baffles that prevent circulation of air and consequent heat loss by convection. The refrigerated chamber 21 is fitted with tray supporting brackets 35 which are similar in construction to the drawer supporting brackets 33, being constructed to contain the same number of trays in a column as the drawer brackets have drawers, and with the same vertical spacing between trays as there is between drawers.

The cart is connected to an energy source through cord 36 so that the heating and cooling elements of the cart may be operated electrically. Heat may be produced by ordinary resistance heaters 37. Refrigeration is produced by the operation of a compressor 38, a blower 39 and a radiator 40 operating in the usual manner through expansion valves which are well known to the art, to compress and cool a refrigerating gas such as ammonia, sulfur dioxide or commercial refrigerants such as Freon.

Heat absorbing members 41 are in heat conducting contact with the tubes 42 through which the cooled, compressed refrigerating gases expand. These heat absorbing members may consist of two spaced sheets of metal sealed at their edges, between which is maintained a substance that experiences a change of state at a temperature which will produce the desired temperature condition within the cold chamber. For example, brine solutions may be frozen between the plates to provide large quantities of heat absorption at a constant temperature due to the heat of fusion of the frozen brine solution. By regulating the concentration of the solution, the brine may be maintained, during fusion, at any temperature between 32° F. and 0° F. Other suitable heat absorbing materials include ethylene glycol which melts at 5° F., ethylene glycol-water solutions which may melt at temperatures up to 32° F. and as low as −55° F., normal dodecane which melts at 10.5° F. It may be seen that any number of pure materials or solutions of materials may be employed for this purpose so that virtually any temperature may be maintained in the refrigerated chamber during a change of state.

By employing two spaced heat absorbing members 41, a colder chamber 43 is formed in the refrigerated chamber. Dispensing drawers 44 maintained between the two heat absorbing members 41 may hold such foods as ice cream or sherbet at a lower temperature than the general temperature existing in the refrigerated chamber 21. Drawers 44 are constructed with lips 45 and are supported horizontally by supports 46. The lips 45 function both as pulls and as baffles to break up circulating air streams that should tend to warm the food in the refrigerated chamber. The drawers 44 also perform the function of maintaining heat absorbing members 41 rigid and spaced from each other.

The heaters 37 are shown disposed against the rear wall of heated chamber 20. The heaters are preferably in heat conducting contact with a heat releasing member 47 which is a material capable of storing heat and releasing it gradually at any given temperature over a period of time. The heat releasing member 37 may be constructed similar to the heat absorbing member 41, consisting of two spaced, edge-sealed plates of metal having a hollow portion between them which is filled with a material that experiences a change of state at a temperature selected to maintain the heated chamber at the desired temperature.

Suitable heat releasing materials may include low melting alloys, salts or organic compounds which experience a change of state at temperatures useful for this purpose. Some examples of suitable alloys are alloys containing two or more of the metals bismuth, lead, antimony and cadmium which may be composited to provide virtually any temperature in the acceptable range. For example, an alloy containing by weight 50% bismuth, 25% lead, 12.5% antimony and 12.5% cadmium melts at 150.8° F. while an alloy containing 30.8% bismuth, 38.4% lead and 30.8% antimony melts at 266° F. Mixtures of two or more of these metals may be made to melt at any temperature up to 1166° F., the melting point of pure antimony. Many stable salts may also be employed as heat releasing materials. For example tin chloride melts at 164° F., aluminum bromide melts at 207° F., magnesium chloride, hexahydrate melts at 244° F. and so forth. By way of further example certain organic compounds may be employed such as glutaric acid which melts at 207° F., benzoic acid which melts at 250° F., catechol which melts at 220° F. Factors to be considered when selecting materials to be employed as heat absorbing and heat releasing materials are; the temperature at which a change of state occurs, preferably a change between the solid to the liquid state, the heat of fusion, the availability of the material, whether or not it is toxic or corrosive and the ease with which it is handled.

As best illustrated in FIG. 2, the rear of the cart, that is the side opposite the doors, is shown as two panels. The large blank panel 48 covers the rear of the refrigerated chamber and panel 23 covers the rear of the refrigerating mechanism chambers 24 and 32 and is provided with a grille 50 through which cooling air for the refrigerating mechanism is introduced. The cutaway portion of rear panel 23 illustrates a suitable position for the compressor 38 and the blower 39 which sucks air through the radiator 40 to remove heat from compressed refrigerating gas. The blower 39 discharges air through a hole in the solid floor of the blower chamber 32 to blow as a stream over compressor 38 thereby providing cooling for the compressor. Cooling the compressor is particularly important in this invention since, to provide mobility, the compressor must be confined in a small space wherein cooling by radiation or convection is restricted. An expanded metal floor or equivalent venting means is also provided to the compressor chamber to provide means for exhausting air from that chamber.

The tray supporting brackets 35 and drawer supporting brackets 33 may be identically constructed and may, therefore, be interchangeably employed in the cart of this invention. Whether interchangeable or not, however, both are constructed of vertical columns and horizontal supports with the horizontal supports having the same vertical spacing in each. The bracket construction, as best shown in FIG. 6, consists of at least two upright columns 52, to which a series of horizontal supporting members 53 are secured. Each column, as shown herein, is folded to provide an elongated lip 54 which terminates short of the extremes of the column. The lip portion provides lateral rigidity to the columns and may be omitted from the structure when the columns are sufficiently rigid.

The horizontal supporting members 53 are constructed with an L-shaped cross section having a vertical leg 55 and a horizontal leg 56. The vertical leg 55 is secured to each of the columns 52 so that the horizontal leg portion 56 extends into the chamber to receive and hold trays or drawers 57 which are represented in FIG. 6 in broken lines. As best shown in FIG. 6, bracket-holding buttons 58 are secured to the bottom of both the hot and cold chambers to hold the dish and drawer supporting brackets securely and the proper distance apart. Similar buttons are secured to the top of each chamber. The buttons 58 are aligned so that the spaces between them hold the brackets 35 against lateral movement. When a plurality of rectilinearly positioned buttons are employed the brackets may be spaced various distances apart to accommodate trays or drawers of different widths. A bracket support 60 which may have the same cross-section as horizontal supports 53, is secured to the lower portions of the tray supporting brackets 55 to hold them at the proper elevation with respect to the cabinet and to prevent the bottom of the columns from bearing on the floor and binding when installing or removing the brackets from the chambers.

The door assembly of this invention is best illustrated in FIG. 8. The main cabinet 10 is provided with a lower hinge receiving bracket 61 and an upper hinge receiving bracket 62 which are both perforated to receive a lower hinge pintel 64 and an upper hinge pintle 65. The lower hinge receiving bracket 61 must support the weight of the doors and accordingly should be formed from a channel or angle iron which is securely fixed to the bottom of cabinet 10. The upper hinge receiving bracket 62 maintains the doors in a vertical position and may be constructed of an angle-iron clip which is secured to the cabinet 10. The pintles extend through hinges 63 which permit the door on either side thereof to open 180° thereby providing complete access to any two columns of trays or drawers at any time. This construction also permits the doors to be in an opened position without extending beyond the frame of the cart so that it may pass through doorways or corridors with the doors open. The lower hinge pintle 64 is provided with a collar 66 which provides a bearing surface for the rotating pintle, and in addition maintains the vertical position of the door panels 67 to properly enclose the opening in the front of the heated and refrigerated chambers. Door panels 67 may be solid metal panels as shown or they may be edge-sealed, double metal sheets having an air space or other insulating material maintained between them. In addition, although not shown, cabinet 10 may be provided with a latch that cooperates with the doors to maintain them in closed position.

The doors illustrated in this embodiment of the invention may be readily removed from the cabinet 10 simply by lifting the entire door assembly so that upper hinge pintle 65 slides far enough through upper hinge receiving bracket 62 so that the lower hinge pintle 63 is raised completely free of the lower hinge receiving bracket 61. In that position the door assembly may be tilted into the position shown in broken line representation in FIG. 8, after which lowering the door assembly until upper hinge pintle 65 is free of its retaining perforation results in complete removal of the doors from the cabinets without the use of tools.

The beverage containers contemplated for use with the cart of this invention are double-walled, insulated containers of stainless steel, aluminum or other suitable material which are adapted to fit snugly in beverage receptacle recess 24 during transportation from the kitchen to the point of dispensing, and to fit on the cowl 30 while beverage is being dispensed. The containers may be fitted with valves, pumps or other convenient means for transferring beverage from the container to a glass or cup.

The food serving cart of this invention is advantageously employed in the following manner. A suitable time prior to its use, for example about one hour, the food serving cart is completely assembled with brackets, drawers, trays and doors installed, and it is plugged into a source of electrical energy which actuates the heating and cooling devices. The inside of the heated chamber is brought up to the desired temperature, and if a heat releasing member is employed, the chamber is heated until a change of state occurs in the heat releasing material. Similarly the inside of the refrigerated chamber is cooled to effect a change of state of the heat absorbing material. Automatic controls may be employed to prevent overheating or overcooling of these chambers and to insure that a complete change of state of the heat absorbing and heat releasing materials occurs. For example, a heat sensitive element 71 such as a thermocouple or bimetal strip may be disposed in contact with the heat releasing member and may operate through a preset automatic switch 72 to stop the flow of electrical energy when the temperature of this material is slightly, for example 5° F., higher than the temperature at which a change of state occurs. This mode of control will open the heating circuit only after all of the heat absorbing material has changed state and has accumulated 5° F. of superheat. If desired, the same type of control may be employed in the refrigerated chamber using a heat sensitive element 73 which actuates an automatic switch 74 to interrupt the electric current to the motor that drives compressor 38.

When the heated and refrigerated chambers are sufficiently heated and cooled, a dish holding the hot portion of a patient's meal is placed in each drawer of the heated chamber along with containers for hot beverages such as soup dishes or coffee cups. The drawer is then closed and the hot food therein is maintained at the proper temperature. When in the restricted area of the drawer, the air above the food is soon saturated and drying of the food is prevented thereby maintaining high palatability with regard to its condition as well as its temperature. As each hot food dish is placed in its drawer, the cold food tray that is to be served with that hot dish is placed in a bracket in the refrigerated chamber that corresponds, position wise to the drawer in which the hot dish was placed. The contents of the cold trays, such as salads, fruits, bread, cereals, milk, juices and containers therefor, are maintained at their most palatable temperature and in crisp condition since they are not subjected to the steamy atmosphere produced by the hot foods.

Ice cream, sherbets and other frozen desserts may be loaded into the drawers in the chamber between the heat absorbing plates where a colder temperature exists than in the general refrigerated chamber area so that these foods too may be maintained at a temperature most suitable for preserving their palatability.

When fully loaded the cart of this invention is unplugged and wheeled to its destination. Carts of this construction maintain food at proper temperature for an hour or longer so that ample time is available for serving all patients' meals that are as tasty as when prepared. In the event of a delay in serving, the cart may be plugged into any convenient electric outlet so that additional heat and refrigeration may be provided to the chambers indefinitely.

Preferably, the food to be served patients in successive rooms is placed in successive drawers or on successive trays so that the hot dish and the cold tray for each patient are not only serially arranged, but they occupy the same relative positions in each chamber and are the same height above the floor. With this arrangement, the various portions of each patient's diet are so completely identified with the other portions of that patient's diet that confusion during serving and during loading of the cart is largely obviated.

When all of the dishes have been served the cart is returned to the kitchen for cleaning. First the doors are removed simply by being lifted from their holding brackets. All of the drawers and trays slide completely from their holding brackets and the holding brackets themselves are slid from the chambers to present a completely unobstructed and accessible interior which may be easily, quickly, and most important, thoroughly cleaned. When removed from the cabinet, the doors present a smooth, unobstructed surface so that their cleaning may be readily and thoroughly accomplished. When removed from the cart the drawer and tray brackets as well as the drawers and trays may be completely submerged in hot soapy water or in other cleaning or sterilizing media. In addition the beverage containers may be completely removed from the cart and cleaned and sterilized remote from it.

Since the cart of this invention is to be subjected to frequent and complete cleaning, it is preferably constructed of a material suitable for this purpose such as stainless steel or aluminum. The seams are preferably welded to seal each chamber from each other chamber and from the insulated space between walls. The insulation is moisture resistant material such as fiber glass, rock wool, asbestos or other fibrous mineral or it may be an air space.

The foregoing description relates to a presently preferred embodiment of my invention and many variations may be made in that embodiment without departing from the broad scope of the invention. For example, the caster-type wheels shown may be unsuitable for traversing rough surfaces and larger wheels may be employed when conditions indicate. The number and disposition of heat absorbing and heat releasing members may be altered and the mode of transmitting heat to or removing it from these members may be modified. The cart of this invention may be adapted with waste containers, silverware containers, linen containers or other similar devices to perform useful functions in conjunction with the process of serving food.

The food serving cart of this invention provides a convenient, efficient and compact device for serving meals at their most palatable condition. The cart may be completely disassembled for cleaning easily and without the use of tools to insure a sterile environment for prepared foods prior to serving them. In addition, this cart is versatile, being capable of accommodating various sized trays and dishes which are arranged to prevent diet confusion, an important factor in the feeding of hospital patients.

Having thus described my invention, what I claim is:

A food serving cart comprising in combination, a frame, wheels supporting said frame, an enclosed cabinet supported on said frame, a thermally insulated, electrically heated chamber within said cabinet, a thermally insulated, refrigerated chamber within said cabinet, a material experiencing a change of state and releasing heat at a temperature that maintains said heated chamber at a desired temperature in thermal communication with an electric heating element and with the interior of said heated chamber, two spaced plate-like heat absorbing members in said refrigerated chamber, each of said plate-like members comprising two edge-sealed metal sheets containing therebetween a material that experiences a change of state and absorbs heat at a temperature that maintains said refrigerated chamber at a desired temperature, slidably removable brackets maintained in said heated chamber and said refrigerated chamber, a plurality of vertical columns of drawers in said heated chamber supported on said slidably removable brackets, a plurality of vertical columns of trays in said refrigerated chamber supported on said slidably removable brackets, said refrigerated chamber having the same number of columns of trays as said heated chamber has columns of drawers and each column of trays having the same number of trays as each column of drawers has drawers, center-hinged doors on said cabinet to provide access to said heated and insulated chamber, said doors connected to said chamber through perforated members attached to said enclosed cabinet above and below the opening to said chambers, upper and lower hinge extension pins extending from the hinges on said doors, said lower pin being disengageable from said perforated door holding member when said doors are lifted to contact the upper of said perforated members, whereby said doors may be removed from said cabinet by lifting to disengage the hinges, and a refrigerator connected to provide refrigeration to said refrigerated chamber, whereby to provide a cabinet from which all drawers, trays, doors and holding brackets are removable to present an unobstructed interior for cleaning after use.

References Cited in the file of this patent

UNITED STATES PATENTS

| | | |
|---|---|---|
| 982,767 | Dunham | Jan. 24, 1911 |
| 1,602,266 | Jarkovsky | Oct. 5, 1926 |
| 1,674,352 | Adams | June 19, 1928 |
| 1,881,603 | Hull | Oct. 11, 1932 |
| 2,066,127 | Slayter | Dec. 29, 1936 |
| 2,306,106 | Hasenburger et al. | Dec. 22, 1942 |
| 2,309,513 | Kramer | Jan. 26, 1943 |
| 2,311,549 | James | Feb. 16, 1943 |
| 2,327,355 | Kleist | Aug. 24, 1943 |
| 2,496,220 | Kleist | Jan. 31, 1950 |
| 2,515,298 | Feldman | July 18, 1950 |
| 2,636,797 | Alheit | Apr. 28, 1953 |
| 2,726,515 | Kleist | Dec. 13, 1955 |
| 2,795,114 | Kleist | June 11, 1957 |
| 2,845,780 | Conklin et al. | Aug. 5, 1958 |
| 2,919,339 | Hilliker | Dec. 29, 1959 |
| 2,936,741 | Telkes | May 17, 1960 |